(12) United States Patent
Martin et al.

(10) Patent No.: US 9,573,576 B2
(45) Date of Patent: Feb. 21, 2017

(54) VACUUM BOOST FOR VEHICLE BRAKING

(71) Applicant: FORD GLOBAL TECHNOLOGIES, LLC, Dearborn, MI (US)

(72) Inventors: Douglas Raymond Martin, Canton, MI (US); Dale Scott Crombez, Livonia, MI (US); Moses Alexander Fridman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 14/486,062

(22) Filed: Sep. 15, 2014

(65) Prior Publication Data

US 2015/0000634 A1  Jan. 1, 2015

Related U.S. Application Data

(63) Continuation-in-part of application No. 12/941,141, filed on Nov. 8, 2010, now abandoned.

(51) Int. Cl.

| | |
|---|---|
| *B60T 13/66* | (2006.01) |
| *F02D 29/02* | (2006.01) |
| *B60T 17/02* | (2006.01) |
| *B60T 17/22* | (2006.01) |
| *F02M 35/10* | (2006.01) |

(Continued)

(52) U.S. Cl.
CPC ............ *B60T 13/662* (2013.01); *B60T 17/02* (2013.01); *B60T 17/221* (2013.01); *F02D 9/02* (2013.01); *F02D 13/0238* (2013.01); *F02D 29/02* (2013.01); *F02D 41/0055* (2013.01); *F02D 41/021* (2013.01); *F02M 35/10229* (2013.01); *F02N 11/084* (2013.01); *F02D 31/001* (2013.01); *F02D 2250/41* (2013.01); *F02D 2700/07* (2013.01); *F02N 2200/0807* (2013.01); *Y02T 10/18* (2013.01); *Y02T 10/47* (2013.01); *Y02T 10/48* (2013.01)

(58) Field of Classification Search
CPC ...... B60W 10/08; B60W 10/06; B60W 20/00; B60W 20/10; B60W 20/40; B60W 20/30; B60W 20/13; B60W 20/15; B60W 20/20; B60W 20/50; B60W 20/14; B60W 20/17; B60W 20/19; B60W 20/18; B60T 13/662; B60T 17/02; B60T 17/221; F02D 29/02; F02D 9/02; F02D 13/0238; F02M 35/10229; F02N 11/084
USPC ............. 123/90.15, 90.16, 90.17, 347, 349; 180/65.21–65.29; 303/114.3, 115.3; 701/110
See application file for complete search history.

(56) References Cited

U.S. PATENT DOCUMENTS

| | | | |
|---|---|---|---|
| 5,826,559 A | * | 10/1998 | Ichimoto ................. B60T 13/72 123/295 |
| 6,095,116 A | | 8/2000 | Matsushita et al. |

(Continued)

*Primary Examiner* — Sizo Vilakazi
(74) *Attorney, Agent, or Firm* — Raymond L. Coppiellie; Brooks Kushman P.C.

(57) ABSTRACT

Methods for controlling vacuum within a brake booster by modifying powertrain operation include determining an intake manifold vacuum in response to actuation of a brake pedal. Increasing the intake manifold vacuum if the brake booster vacuum is less than a desired brake booster vacuum. In some embodiments, the transmission is downshifted to increase engine speed and intake manifold vacuum. In other embodiments, engine torque is reduced to increase intake manifold vacuum and the torque of the electric machine is increased to maintain a constant output torque.

14 Claims, 4 Drawing Sheets

(51) Int. Cl.

| | |
|---|---|
| *F02N 11/08* | (2006.01) |
| *F02D 9/02* | (2006.01) |
| *F02D 13/02* | (2006.01) |
| *F02D 41/02* | (2006.01) |
| *F02D 41/00* | (2006.01) |
| F02D 31/00 | (2006.01) |

(56) References Cited

U.S. PATENT DOCUMENTS

| | | | |
|---|---|---|---|
| 6,305,757 B1 | 10/2001 | Ohsaki et al. | |
| 6,434,475 B2 | 8/2002 | Kaneko et al. | |
| 6,557,524 B2 | 5/2003 | Tsunooka | |
| 6,732,578 B2 | 5/2004 | Kerns | |
| 6,830,536 B2 | 12/2004 | Ogiso et al. | |
| 6,866,020 B2 | 3/2005 | Allston et al. | |
| 7,040,719 B2 | 5/2006 | Collins et al. | |
| 7,100,565 B2 | 9/2006 | Allen et al. | |
| 7,152,933 B2 | 12/2006 | Collins | |
| 7,278,941 B2 | 10/2007 | Holmes et al. | |
| 7,363,915 B2 | 4/2008 | Surnilla et al. | |
| 8,353,266 B2* | 1/2013 | White | F02D 41/062 123/179.16 |
| 2001/0025220 A1* | 9/2001 | Kaneko | B60K 6/485 701/112 |
| 2001/0035159 A1* | 11/2001 | Tsunooka | B60T 13/52 123/399 |
| 2003/0130090 A1* | 7/2003 | Tanaka | B60W 10/06 477/110 |
| 2006/0049690 A1* | 3/2006 | Collins | B60T 13/72 303/114.3 |
| 2008/0164753 A1* | 7/2008 | Crombez | B60T 1/10 303/114.3 |
| 2015/0336583 A1* | 11/2015 | Pursifull | B60W 30/18054 477/92 |

* cited by examiner

VACUUM BOOST FOR VEHICLE BRAKING

CROSS-REFERENCE TO RELATED APPLICATIONS

This application is a continuation-in-part of U.S. application Ser. No. 12/941,141 filed Nov. 8, 2010, currently pending, the disclosure of which is hereby incorporated in its entirety by reference herein.

TECHNICAL FIELD

A system and method for controlling an engine to provide a desired vacuum within a brake booster is disclosed.

BACKGROUND

To improve engine efficiency, measures are taken to reduce pumping losses at part load operation. This involves reducing intake manifold pressure. Power brakes are typically vacuum assisted, with the vacuum provided from the intake manifold. If the engine is commanded to operate for a long period at a condition with low intake manifold vacuum, the vacuum within the brake booster may drop to a level which is marginal or insufficient for a present or subsequent braking operation.

SUMMARY

The present disclosure describes a system and method for ensuring vacuum boost for vehicle braking. The engine is control by: estimating a desired brake booster vacuum that ensures braking of the vehicle at a present operating condition of the vehicle, determining intake manifold vacuum, and increasing engine rpm when the manifold vacuum is less than the desired brake booster vacuum. In one alternative the engine is coupled to a continuously variable transmission (CVT) and the gear ratio in the CVT is adjusted in conjunction with the increasing engine rpm so that vehicle speed substantially equals a demand by an operator of the vehicle. In another alternative, the engine is coupled to an automatic transmission and the transmission is downshifted in conjunction with the increasing engine rpm so that vehicle speed substantially equals a demand by an operator the vehicle. In one alternative, the actual brake booster vacuum is determined and the engine rpm is increased in response to both the manifold vacuum level and the actual brake booster vacuum being less than the estimated brake booster vacuum. The actual brake booster vacuum is determined based on one of a signal from a vacuum sensor coupled to the brake booster and a model of brake booster vacuum. In vehicle including stop-start, i.e., ones in which the engine is shutoff and restarted independently of an operator request, the actual brake booster vacuum is estimated and the engine is restarted when the actual brake booster vacuum is less than the estimated brake booster vacuum. In engines with variable cam timing, cam timing is adjusted to a position which increases manifold vacuum when the manifold vacuum level is less than the estimated brake booster vacuum.

According to some embodiments in which the engine has variable cam timing, a desired brake booster vacuum that ensures braking of the vehicle at a present operating condition of the vehicle is estimated; intake manifold vacuum is determined, possibly by a sensor in the intake; and the intake manifold vacuum when the intake manifold vacuum is less than the estimated brake booster vacuum is increased. The intake manifold vacuum is increased by adjusting cam timing. If such measure is insufficient to provide the desired intake manifold vacuum, engine rpm is increased. In some embodiments, the actions taken to increase intake manifold vacuum are taken only when both the intake manifold vacuum and the actual brake booster vacuum are less than the desired brake booster vacuum. The intake manifold vacuum is further increased by increasing engine speed while adjusting a throttle valve in an engine intake toward a more closed position. The increasing the intake manifold vacuum is further based on a brake pedal coupled to the vehicle being depressed. Increasing the intake manifold vacuum, adjusting the cam timing, and increasing the engine speed are constrained to provide an operator demand for torque. In one embodiment a maximum engine torque is determined to protect vacuum by increasing the intake manifold vacuum, adjusting the cam timing, and increasing the engine speed, but such measures are constrained to provide the lower of an operator demand for torque and the maximum engine torque.

A vehicle is disclosed which includes wheels, brakes proximate the wheels, an internal combustion engine providing torque to the wheels via a drive train, a brake pedal, a brake booster fluidly coupled to an intake manifold of the engine and mechanically coupled to the brake pedal, a master cylinder mechanically coupled to the brake booster with the master cylinder having a hydraulic fluid and coupled to the brakes via hydraulic lines, and an electronic control unit electronically coupled to the engine. The ECU determines intake manifold vacuum, a desired brake booster vacuum that ensures braking of the vehicle at a present operating condition of the vehicle, and actual brake booster vacuum. The ECU commands the engine to increase manifold vacuum when both the intake manifold vacuum and the actual brake booster vacuum are less than the desired brake booster vacuum. In engine with a variable cam timing system coupled to the engine, the increase in intake manifold vacuum includes adjusting cam timing. The intake manifold vacuum is increased by the ECU simultaneously increasing engine speed and adjusting a throttle valve in the intake manifold to a more closed position. The actual brake booster vacuum is based on a signal from a vacuum sensor disposed in the brake booster. In engines in which the ECU commands the engine to stop and restart independently of a command by an operator of the vehicle, the ECU commands the engine to restart when actual brake booster vacuum is less than the desired brake booster vacuum.

According to one aspect of this disclosure, a method is disclosed for controlling brake vacuum within a brake booster on a vehicle that includes an engine and a transmission. An intake manifold vacuum is determined in response to actuation of a brake pedal. The transmission is downshifted to increase engine speed and intake manifold vacuum when the intake manifold vacuum is less than a desired brake booster vacuum. The torque of the engine is reduced to maintain a constant power output of the engine.

According to another aspect of this disclosure, a method is disclosed for operating a powertrain of a vehicle including an engine and an electric machine. A powertrain toque request is received by the vehicle. In response to application of a brake pedal, the torque of the engine is reduced to increase vacuum in an intake manifold when the vacuum is less than a required brake booster vacuum. To offset the reduced engine torque, the torque of the electric machine is increased to meet the powertrain torque request.

According to yet another aspect of this disclosure, a method is disclosed for operating a powertrain of a vehicle including an engine and an electric machine. A powertrain toque request is received by the vehicle. A first signal is received indicating brake booster vacuum. A second signal is received indicating intake manifold vacuum.

In response to application of a brake pedal, the torque of the engine is reduced to increase the intake manifold vacuum if the brake booster vacuum is less than a desired brake booster vacuum and if the intake manifold vacuum is less than the desired brake booster vacuum. To offset the reduced engine torque, the torque of the electric machine is increased to meet the powertrain torque request.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components or processes are arranged in a slightly different order than shown in the embodiments in the Figures. Those of ordinary skill in the art will recognize that the teachings of the present disclosure may be applied to other applications or implementations.

Figure 1:
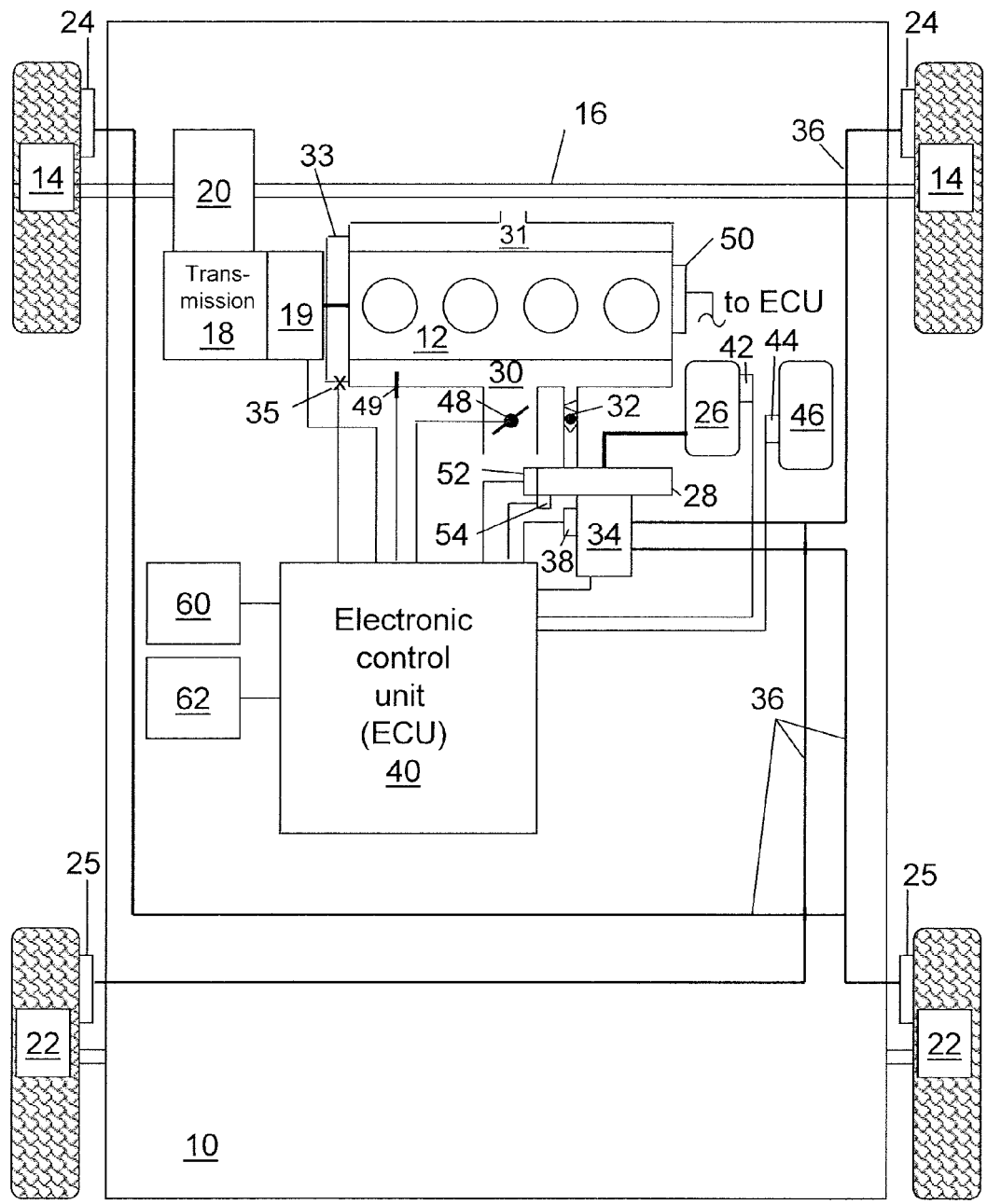
FIG. 1 is a schematic of a vehicle according to an embodiment of the disclosure.

In FIG. 1, a vehicle 10 is shown that is powered by an internal combustion engine 12. Engine 12 drives wheels 14 of an axle 16 through a transmission 18 with a torque converter 19 and a differential 20. Each of the driven wheels 14 and non-driven wheels 22 are provided with a brake 24. Actuation of brakes 24 are initiated by an operator of vehicle 10 depressing a brake pedal 26. A force applied by the vehicle operator is amplified via a brake booster 28, Brake booster is supplied manifold vacuum from an intake manifold 30 coupled to engine 12. A check valve 32 is provided in between brake booster 28 and intake manifold 30 so that when manifold vacuum in intake manifold 30 drops below that which exists in brake booster 28, check valve 32 closes to maintain the vacuum existing in brake booster 28. Brake booster 28 acts upon master cylinder 34 to pressurize fluid within. The pressurized fluid is supplied to brakes 24 through hydraulic lines 36.

Engine 12 also has an exhaust manifold 31. A portion of exhaust gases may be removed from the exhaust gas system and recirculated to the engine intake manifold, known as EGR. An EGR line 33 is shown with an EGR valve 35.

An electronic control unit (ECU) 40 is provided in vehicle 10. ECU 40 is shown as a single unit in FIG. 1. However, ECU 40 can be a distributed computing system with multiple modules. ECU 40 is provided signals from sensors and provides signals to control various vehicle components. Per the embodiment shown in FIG. 1, ECU 40 is provided with pedals sensors 42 and 44 coupled to brake pedal 26 and an accelerator pedal 46, respectively. Sensors 42 and 44 can be linear sensors detecting an amount of pedal travel, angle sensors detecting an amount of rotation of the pedal, or any suitable sensor. In one embodiment, sensor 42 coupled to brake pedal 26 is an on-off sensor indicating when the brake is being depressed. Air flow to engine 12 is provided through intake manifold 30 and controlled by a throttle valve 48. Throttle valve 48 is controlled by ECU 40, the ECU at least partially basing the command to throttle valve 48 on operator demand, as detected via input to accelerator pedal 46. An intake manifold vacuum sensor 49 is disposed in intake manifold 30. Alternatively, a mass air flow sensor can be provided and the intake manifold vacuum can be inferred from engine speed and mass air flow. ECU 40 also controls flow through EGR duct 33 by controlling the position of EGR valve 35.

In one embodiment, engine 12 is equipped with a variable cam timing (VCT) 50 device. The most commonly available VCTs are capable of varying the phasing of intake and/or exhaust valves, depending on whether variable cam timing is provided for both intake and exhaust valves. By adjusting the timing of valve events, based on the engine operating conditions, engine efficiency and/or performance can be improved. Other less common VCTs allow adjustment of the valve open duration. Yet other VCT devices allow for adjusting valve lift. By adjusting the valve phasing and/or lift, efficiency of engine 12 can be improved at part load conditions by reducing pumping work of engine 12, i.e., the amount of energy lost due to drawing in fresh air past throttle valve 48, thereby producing a vacuum in intake manifold 30. A consequence of reducing pumping work is a lower intake manifold pressure and thus less vacuum available for brake booster 28. VCT 50 is commanded by ECU 40, the connection only partially shown.

In the embodiment shown in FIG. 1, a vacuum sensor 52 is coupled to brake booster 28. A signal from vacuum sensor 52 is supplied to ECU 40, from which it can be determined whether sufficient vacuum exists in brake booster 28 for subsequent brake actuations.

Electrical connections shown in FIG. 1 can be, in alternative embodiments, supplanted by wireless communication. ECU 40 is shown coupled to various sensors 60 and various actuators 62. A non-exhaustive list of sensors, which may be coupled to ECU 40 depending on the embodiment, are used to measure engine coolant temperature, ambient air temperature, pressure drop across exhaust gas recirculation (EGR) valve 35, exhaust gas oxygen, intake manifold vacuum, engine speed, vehicle speed, mass air flow, wheel speed, etc.

A non-exhaustive list of other actuators to which ECU 40 may be providing control signals include: fuel injection pulse width to fuel injectors, EGR valve position, anti-lock braking, vehicle stability controller, transmission 18, torque converter coupled to transmission 18, etc.

Figure 2:
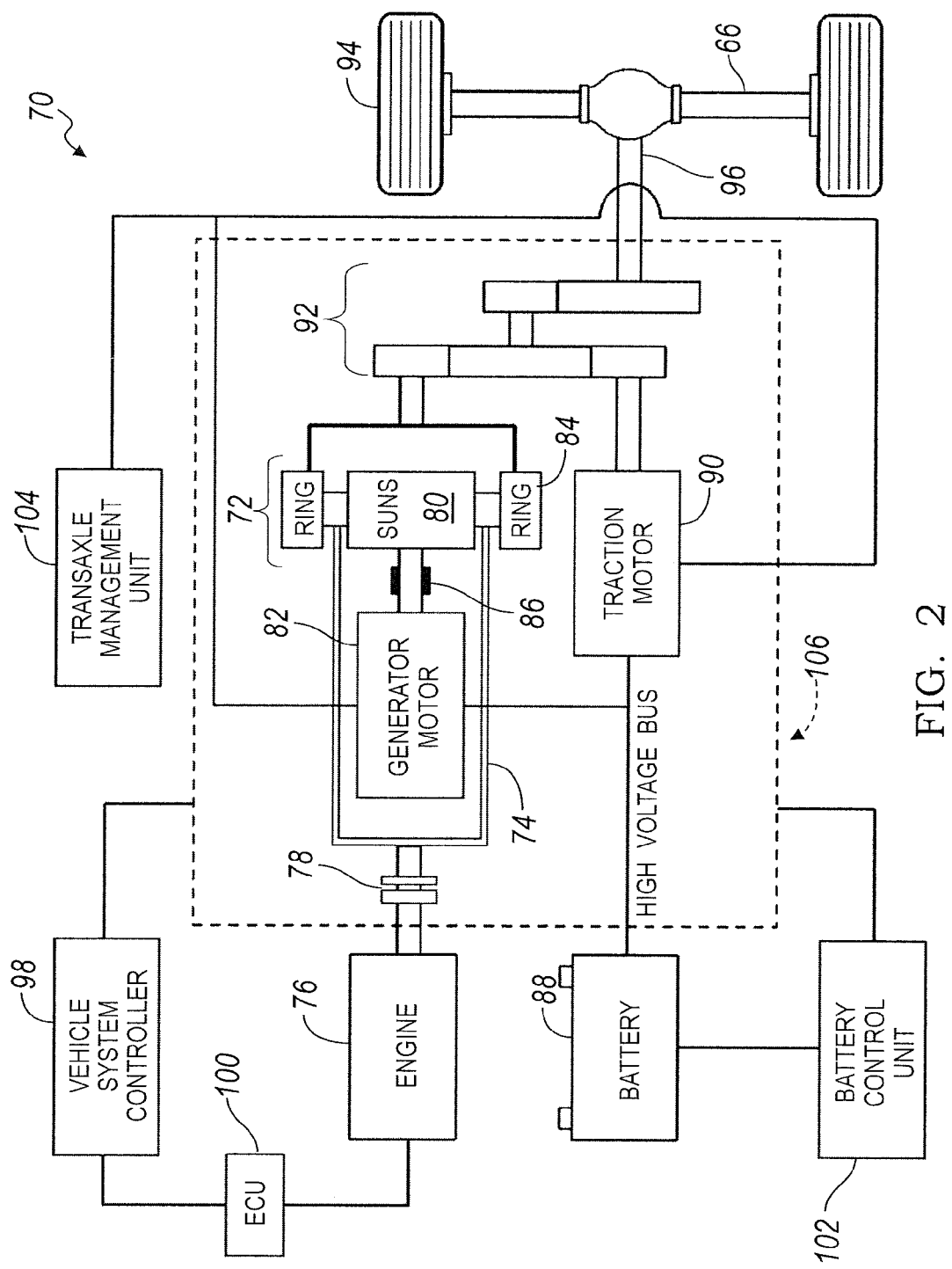
FIG. 2 is a schematic of a hybrid vehicle according to one embodiment of the disclosure.

Referring to FIG. 2, a hybrid vehicle 70 is illustrated according to one embodiment. The vehicle 70 includes a planetary gear set 72 mechanically coupling a carrier gear 74 to an engine 76 via a one way clutch 78. The planetary gear set 72 also mechanically couples a sun gear 80 to a generator motor 82 and to a ring (output) gear 84. The generator motor 82 also mechanically links to a generator brake 86 and is electrically linked to a battery 88. A traction motor 90 is mechanically coupled to the ring gear 84 of the planetary gear set 72 via a second gear set 92 and is electrically linked to the battery 88. The ring gear 84 of the planetary gear set 72 and the traction motor 90 are mechanically coupled to drive wheels 94 via an output shaft 96.

The planetary gear set 72, splits the engine output energy into a series path from the engine 76 to the generator motor 82 and a parallel path from the engine 76 to the drive wheels 94. Engine speed can be controlled by varying the split to the series path while maintaining the mechanical connection through the parallel path. The traction motor 90 augments the engine power to the drive wheels 94 on the parallel path through the second gear set 92. The traction motor 90 also provides the opportunity to use energy directly from the series path, essentially running off power created by the generator motor 82. This reduces losses associated with converting energy into and out of chemical energy in the battery 88 and allows all engine energy, minus conversion losses, to reach the drive wheels 94.

A vehicle system controller (VSC) 98 controls many components in this configuration by connecting to each component's controller. An engine control unit (ECU) 100 connects to the Engine 76 via a hardwire interface. In one example, the ECU 100 and VSC 98 can be placed in the same unit, but are actually separate controllers. Alternatively, they may be the same controller, or placed in separate units. The VSC 98 communicates with the ECU 100, as well as a battery control unit (BCU) 102 and a transaxle management unit (TMU) 104 through a communication network such as a controller area network (CAN) 106. The BCU 102 connects to the battery 88 via a hardware interface. The TMU 104 controls the generator motor 82 and the traction motor 90 via a hardwire interface. The control units 98, 100, 102 and 104, and controller area network 106 can include one or more microprocessors, computers, or central processing units; one or more computer readable storage devices; one or more memory management units; and one or more input/output devices for communicating with various sensors, actuators and control circuits.

Figure 3:
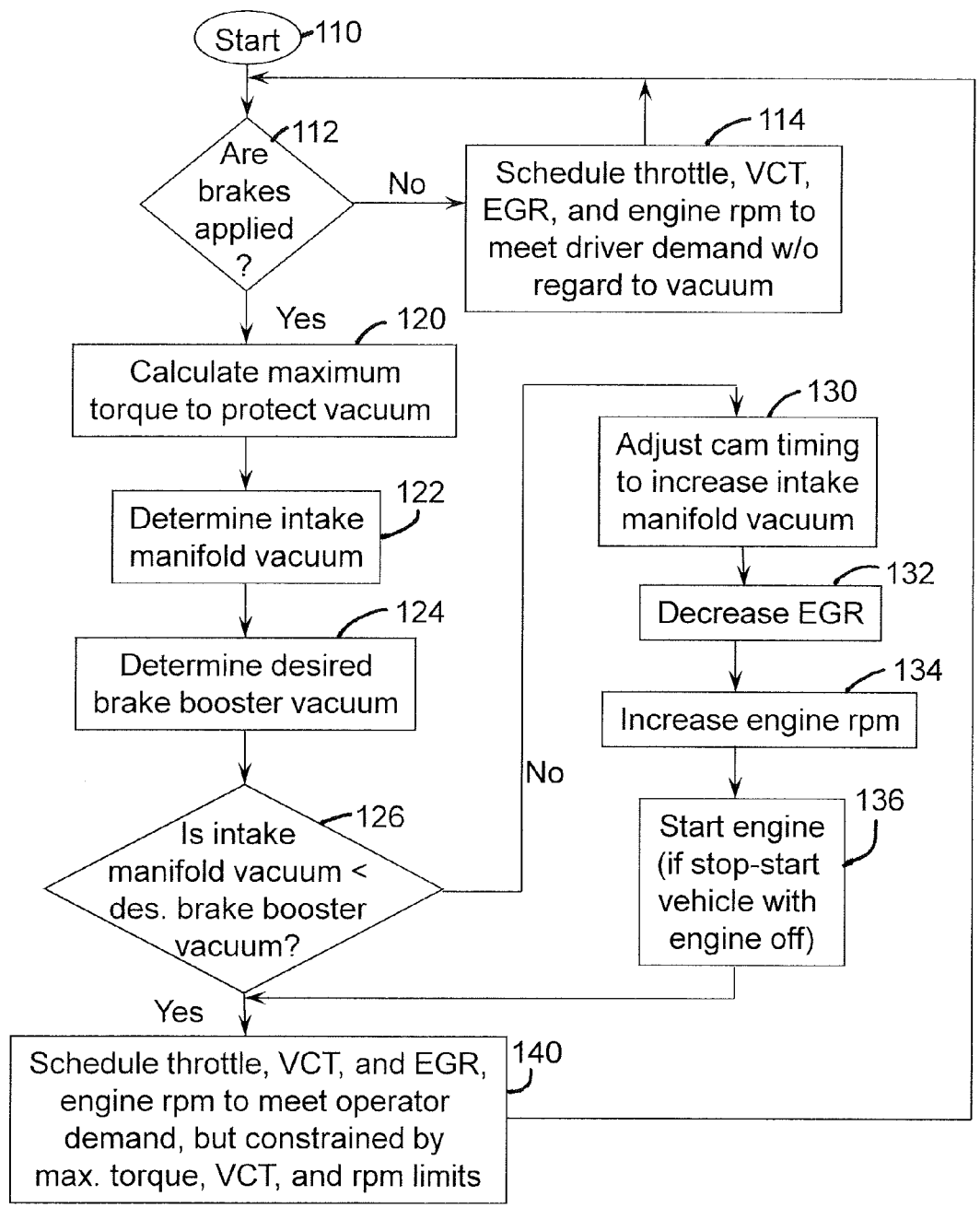
FIG. 3 is a flowchart illustrating an embodiment of the disclosure.

In FIG. 3, an algorithm according to one embodiment of the disclosure starts at 110. In decision block 112, it is determined whether the brakes are applied. Vehicle braking may be accomplished by mechanical friction brakes (i.e. disk brakes including calipers and rotors) or by regenerative braking. If not control passes to block 114 in which the engine parameters, throttle, VCT, and engine rpm are scheduled per normal methods, i.e., without regard to maintaining a particular vacuum level for the brakes. If the brakes are applied control passes to block 120. Engine torque may be adjusted to increase or decrease the vacuum in the intake manifold.

At block 120 the controller calculates the maximum amount of torque the engine can produce while maintaining a threshold amount of vacuum in the intake manifold. For example, the controller may calculate the maximum amount of torque that the engine can produce while maintaining a vacuum of 20 kilopascals (kPa) in the intake manifold.

The torque output of the engine is function of the operating conditions, such as the engine speed (RPM) and the load. The controller may include lookup tables that estimate the engine torque for a given operating condition. The controller may also include lookup tables that estimate the maximum torque allow to maintain a desired intake manifold pressure for a given operating condition.

Control passes next to block 122 to determine intake manifold vacuum. In one embodiment, the intake manifold vacuum is directly measured; alternatively, intake manifold vacuum is inferred based on other sensors. Control passes to block 124 to determine a desired brake booster vacuum. This is a vacuum which is sufficient to brake the vehicle at the present operating conditions. This value may be a constant value such as 20.23 kPa. In one embodiment, the desired brake booster vacuum is determined including an additional amount to provide an excess factor. In block 126, it is determined whether the intake manifold vacuum is greater than the desired brake booster vacuum. If so, then there is sufficient vacuum in intake manifold 30, which is coupled to brake booster 28, to brake vehicle 10. In an alternative embodiment, it is determined in decision block 116 whether either intake manifold vacuum or actual brake booster vacuum is greater than the desired brake booster vacuum. The actual brake booster vacuum can be based on vacuum sensor 52 in brake booster 26 or by modeling the vacuum based on other engine parameters and braking history. If insufficient vacuum is determined in decision block 126, control passes to block 130. With an engine equipped with variable cam timing the VCT can be adjusted to provide a greater intake manifold vacuum. VCT is typically used to reduce pumping losses due to a pressure difference across the throttle valve, i.e., intake manifold vacuum is reduced. In the case of a desire to increase the intake manifold vacuum to provide for braking, the VCT can be adjusted temporarily to a less desirable position in terms of efficiency. If the VCT has insufficient range to affect intake manifold vacuum or if the engine has no VCT, another measure may be taken to increase intake manifold vacuum. EGR is used in engines for a number of advantages, one of which is an efficiency boost by decreasing intake manifold vacuum and thereby reducing pumping losses. The EGR can be temporarily halted, or decreased in block 132, to provide a desired increase in intake manifold vacuum. If an insufficient increase in intake manifold vacuum is achieved, an additional measure is undertaken in 124. In block 134, engine rpm is increased. If only engine speed is increased, then the vehicle speed is increased, which is undesirable when an operator of the vehicle has not commanded it. Thus, to maintain vehicle speed, a drop in engine gear ratio in the transmission is commanded. If the transmission is a continuously variable transmission (CVT), the gear ratio is reduced as much as desired to obtain the desired engine speed. In a transmission with fixed gear ratios, e.g., a conventional automatic transmission, a downshift is commanded and the engine speed is proportionally increased, which may be slightly more than desired to achieve the vacuum. The reason that increasing engine speed increases engine vacuum is that the operator of the vehicle is demanding a particular power from the engine. As power is torque times engine speed, as engine speed is increased, torque is decreased. A decrease in engine torque is accompanied by an increase in intake manifold vacuum.

Some vehicles are stop-start, i.e., the engine is stopped at a stoplight or possibly even during a coast down to conserve fuel. The engine stopping and restarting is accomplished due to ECU commanding it independently of the operator's control, i.e., this is different from the engine stopping due to a key off as commanded by the operator. In such a vehicle, when the engine is off, there is no vacuum in the intake. Thus, if the vehicle is presently coasting down, the actual brake booster vacuum should be greater than the desired brake booster vacuum. If no, then the engine is started up in block 136 to provide vacuum in the intake manifold with such vacuum available to the brake booster. After a measure, or measures, has been taken to ensure sufficient vacuum in the brake booster, control passes to block 130 in which the engine parameters are scheduled, but constrained by the maximum torque determined in block 120, and as constrained by the limits in VCT, EGR, and engine speed.

In the algorithm in FIG. 2, intake manifold vacuum is provided in response to the brake being applied. Alternatively, checking for sufficient intake manifold vacuum can be performed at all times to ensure that there is sufficient vacuum for any subsequent braking that may be commanded. Such determination is based on present vehicle conditions, such as vehicle speed.

Figure 4:
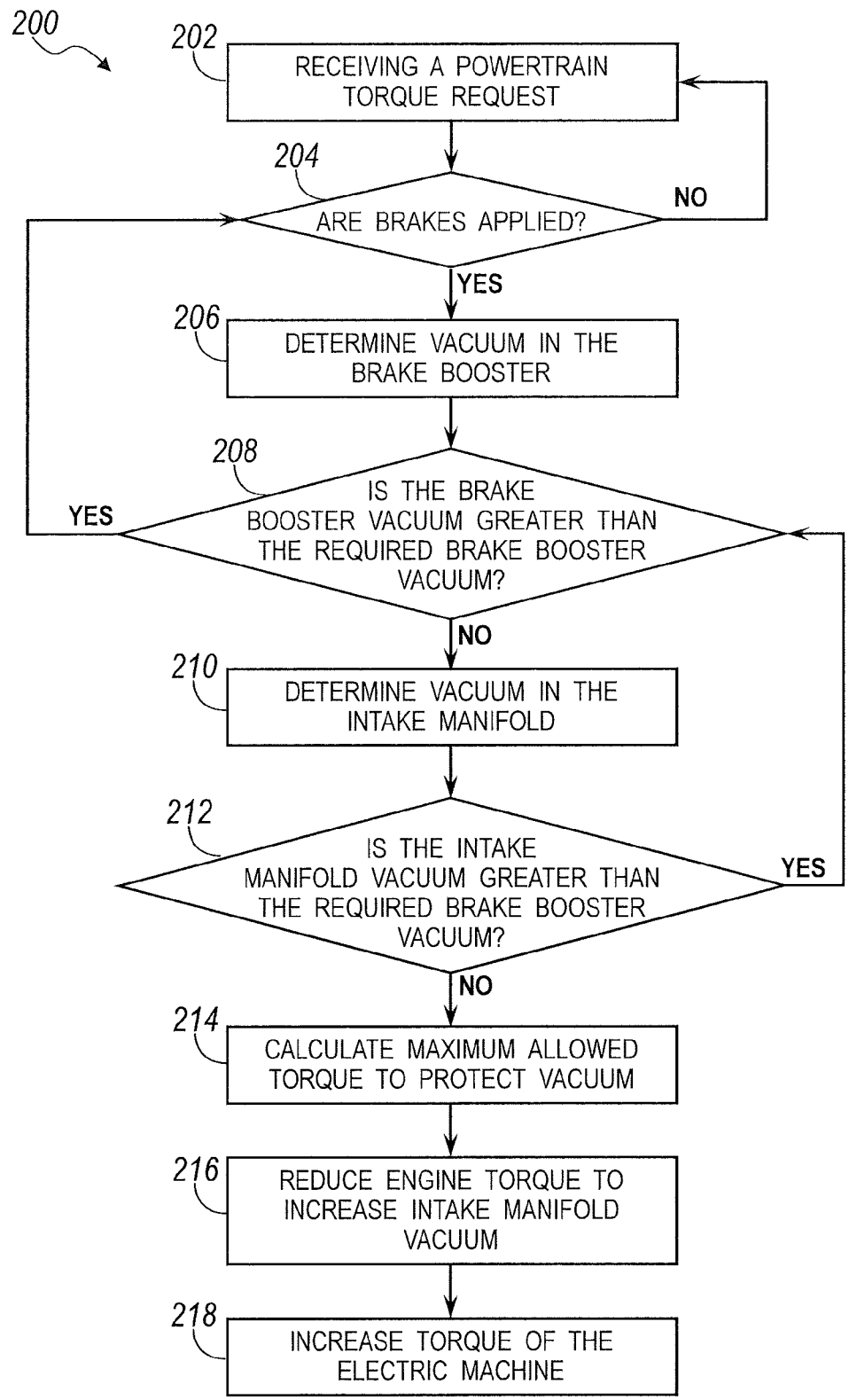
FIG. 4 is a flowchart illustrating another embodiment of the disclosure.

FIG. 4 illustrates a flow chart 200 for operating a powertrain of a vehicle to protect brake booster vacuum. In one embodiment, the vehicle powertrain includes an internal combustion engine, at least one electric machine and a power split transaxle. At block 202 the controller receives a powertrain torque request from the vehicle or the driver. The driver may request torque by depressing the accelerator pedal. The vehicle may request torque to accomplish vehicle functions, such as, charging the traction battery. The powertrain torque request may be split between the internal combustion engine and the at least one electric machine. At block 204 the controller determines if the brakes are applied. This may be determined by the controller receiving a signal indicating that the driver is depressing the brake pedal. If the brakes are not applied control passes back to block 202 and if the brakes are applied control passes to block 206.

At block 206 the controller determines the vacuum within the brake booster. At block 208 the controller determines if the brake booster vacuum is greater than the required brake booster vacuum needed to stop the vehicle. The required brake booster vacuum may be a constant value programmed into memory. For example, the required brake booster vacuum may be 20 kPa. Alternatively, the required brake booster vacuum may vary based on operating conditions and may be calculated dynamically. If the brake booster vacuum is greater than the required brake booster vacuum control passes back to block 204. If the brake booster vacuum is not greater than the required brake booster vacuum control passes to block 210. At block 210, the controller determines the vacuum in the intake manifold. At block 212 the controller determines if the intake manifold vacuum is greater than the required brake booster vacuum. If the intake manifold vacuum is greater than the required brake booster vacuum than control passes to block 204. If the intake manifold vacuum is not greater than the required brake booster vacuum control passes the block 214. At block 214 the controller calculates the maximum allowed torque of the engine to protect intake manifold vacuum. The engine torque is then reduced to the maximum allowed torque in order to increase the vacuum in the intake manifold above the required brake booster vacuum. The torque of the electric machine is increased to offset the reduced engine torque to provide the vehicle with the desired powertrain torque at block 218.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A method of operating a vehicle powertrain including an engine and an electric machine, comprising:
   receiving a powertrain torque request;
   in response to application of a brake pedal and an intake manifold vacuum being less than a required brake booster vacuum, reducing torque of the engine to increase the intake manifold vacuum; and
   increasing torque of the electric machine by a magnitude equal to the reduction in engine torque to meet the powertrain torque request.

2. The method of claim 1 wherein the vehicle further includes a power split hybrid transmission and wherein the method further comprises the step of:
   adjusting gear ratio of the transmission to increase engine speed to further increase the vacuum when reducing the torque of the engine does not increase the vacuum to the required brake booster vacuum.

3. The method of claim 1 wherein the vehicle further includes an exhaust gas recirculation (EGR) system and wherein the method further comprises the step of:
   disabling the EGR to increase the vacuum in the intake manifold when the vacuum is less than the required brake booster vacuum.

4. The method of claim 1 further comprising the steps of:
   stopping the engine to operate in pure electric mode; and
   in response to application of a brake pedal, starting the engine to increase the vacuum in the intake manifold when the vacuum is less than the required brake booster vacuum.

5. The method of claim 4 wherein the engine is started using the electric machine.

6. The method of claim 1 wherein the engine includes variable cam timing and wherein the method further comprises the step of:
   adjusting cam timing of the engine to increase the vacuum in the intake manifold when the vacuum is less than the required brake booster vacuum.

7. A method, of operating a powertrain of a vehicle including an engine and an electric machine, comprising:
   receiving a powertrain torque request;
   receiving a first signal indicating brake booster vacuum;
   receiving a second signal indicating intake manifold vacuum;
   in response to application of a brake pedal, reducing torque of the engine to
   increase the intake manifold vacuum if the brake booster vacuum is less than a desired brake booster vacuum and if the intake manifold vacuum is less than the desired brake booster vacuum; and
   increasing a torque of the electric machine to offset the reduced torque of the engine to meet the powertrain torque request.

8. The method of claim 7 wherein the vehicle further includes a power split hybrid transmission and wherein the method further comprises the step of:
   adjusting gear ratio of the transmission to increase engine speed to further increase the vacuum when reducing the torque of the engine does not increase the vacuum to the desired brake booster vacuum.

9. The method of claim 7 wherein the vehicle further includes an exhaust gas recirculation (EGR) system and wherein the method further comprises the step of:

disabling the EGR to increase the vacuum in the intake manifold when the vacuum is less than the required brake booster vacuum.

10. The method of claim 7 further comprising the steps of:
stopping the engine to operate in pure electric mode; and
in response to application of a brake pedal, starting the engine to increase the vacuum in the intake manifold when the vacuum is less than the desired brake booster vacuum.

11. The method of claim 10 wherein the engine is started using the electric machine.

12. The method of claim 7 wherein the engine includes variable cam timing and wherein the method further comprises the step of:
adjusting cam timing of the engine to increase the vacuum in the intake manifold when the vacuum is less than the desired brake booster vacuum.

13. The method of claim 7 wherein the torque of the electric machine is increased by a magnitude that is based on a magnitude of the reduction in engine torque.

14. The method of claim 7 wherein the torque of the electric machine is increased by a magnitude that is equal to the reduction in engine torque.

* * * * *